United States Patent [19]

Naruo

[11] Patent Number: 5,587,894
[45] Date of Patent: Dec. 24, 1996

[54] POWER SOURCE DEVICE

[75] Inventor: Masahiro Naruo, Shijonawate, Japan

[73] Assignee: Matsushita Electric Works, Ltd., Osaka, Japan

[21] Appl. No.: 412,540

[22] Filed: Mar. 28, 1995

[30] Foreign Application Priority Data

Mar. 28, 1994 [JP] Japan .................................. 6-057868

[51] Int. Cl.$^6$ .............................. H02M 5/42; H02M 7/04
[52] U.S. Cl. .................................................. 363/84; 363/44
[58] Field of Search .................................. 363/44, 56, 84

[56] References Cited

U.S. PATENT DOCUMENTS

| | | | |
|---|---|---|---|
| 4,566,051 | 1/1986 | Komulainen | 363/56 |
| 4,821,166 | 4/1989 | Albach | 363/44 |
| 5,218,523 | 6/1993 | Sugishima | 363/49 |
| 5,229,690 | 7/1993 | Ohnishi et al. | 315/226 |

*Primary Examiner*—Stuart N. Hecker

[57] ABSTRACT

A power source device minimized in size with required number of switching and energy-storing elements for a power conversion reduced is provided by connecting a first energy-storing element through a first switching element in parallel to a power source, connecting a load circuit having a parallel connection of a voltage stabilizer and a load through a second switching element in parallel to the first energy-storing element, connecting an ON/OFF controller to the first and second switching elements for their controlling, and providing a voltage controller including a second energy-storing element and further switching elements for controlling an output voltage to the load circuit through switching operation of the further switching elements.

19 Claims, 19 Drawing Sheets

POWER SOURCE DEVICE

BACKGROUND OF THE INVENTION

This invention relates to a power source device for supplying an energy to a load by means of a high frequency switching operation and controlling an input current distortion.

DESCRIPTION OF RELATED ART

Generally, known power source devices comprise a rectifying circuit for a full wave rectification of an AC power from AC power source, a series circuit of an inductor and a switching element, and a load circuit including a smoothing capacitor and a load and connected through a diode to a connecting point between the inductor and switching element, in which the switching element detects an input current and is controlled by a control circuit which provides a control signal that renders an envelope of the input current to be proportional to an input voltage, and their arrangement is so made that the inductor will be excited with the switching element turned ON to accumulate in the inductor an energy from the input, thereafter, as the switching element is turned OFF, the input and inductor are connected in series to supply the energy to the load circuit, upon which the input current rises when the switching element is ON but falls when the switching element is OFF, and such input current is detected so as to control a higher harmonic distortion of the input current through a control of the switching element.

In the above device, however, there has been a problem that the inductor is required to be of a large size for limiting the input current, and the device has to be large in size.

On the other hand, U.S. Pat. No. 5,229,690 discloses a discharge lamp lighting device which employs no inductor. In this device, an AC source power full-wave rectified by the rectifying circuit, a series circuit of a discharge lamp and a switching element connected, another series circuit of a diode and a smoothing capacitor is connected in parallel to the switching element, and another diode is connected across a connecting point of the said diode to the smoothing capacitor and a positive terminal of the rectifying circuit. This device is to charge the smoothing capacitor through the discharge lamp when the switching element is in OFF state, so as to utilize the charged energy at the time of a low input voltage, for controlling an input higher harmonic.

While this device renders any large inductor unnecessary, there is a limitation in controlling the input higher harmonic, due to that almost no input current flows at moments adjacent to zero-cross points of the input voltage.

Further, U.S. patent application Ser. No. 280,552 proposes a power source device in which a known switched-capacitor circuit is employed, an AC source power is subjected to a full-wave rectification of a rectifying circuit, a load is connected through a first switched-capacitor circuit to the rectifying circuit, and a second switched-capacitor circuit is connected in parallel to the load through a smoothing capacitor to the first switched-capacitor circuit. In this power source device, the arrangement is so made that the two switched-capacitor circuits are used so that one of these circuits performs a power supply to the load circuit while the other accumulates a charge for a power supply at the moments adjacent to the zero-cross points of the input voltage, and the control of the higher harmonic distortion of the input current is executed by changing over capacitors included in the switched-capacitor circuits so as to render the sum of currents flowing through the two switched-capacitor circuits to be proportional to the input power.

This power source device requires, however, the capacitors of a number corresponding to high frequency switching cycles included in each cycle of the commercial source frequency, so as to render the input current to be proportional to the input voltage, and it becomes necessary to employ several thousands of elements for realizing a switching operation in the order of several ten kHz. Since the required number of the elements increases as the operation is made to be of a higher frequency, there arises a problem that a dimensional minimization of the device is difficult.

As has been described, the known power source devices have been problematic generally in that the dimensional minimization of the device and the control of the higher harmonic distortion of the input have confronted with the limitation, and so on.

Accordingly, a primary object of the present invention is to provide a power source device which capable of effectively realizing the control of the higher harmonics and allowing the device size efficiently minimized.

According to the present invention, the above object can be realized by a power source device which comprises a power source a momentary voltage of which fluctuates, a first energy storing means connected through a first switching element across both output ends of the power source, a series circuit of a second energy storing means and a load circuit and connected through a second switching element across both ends of the first energy storing means, means including a third switching element and connected in parallel to the second energy storing means, and a control means for the switching elements, characterized in that the control means controls ON and OFF periods and frequency of the first, second and third switching elements so that a voltage across the first energy storing means is substantially similar to the source voltage and a voltage across the second energy storing means allows an output of a predetermined voltage to be provided to the load circuit.

DETAILED DESCRIPTION OF THE PREFERRED EMBODIMENTS

Figure 1:
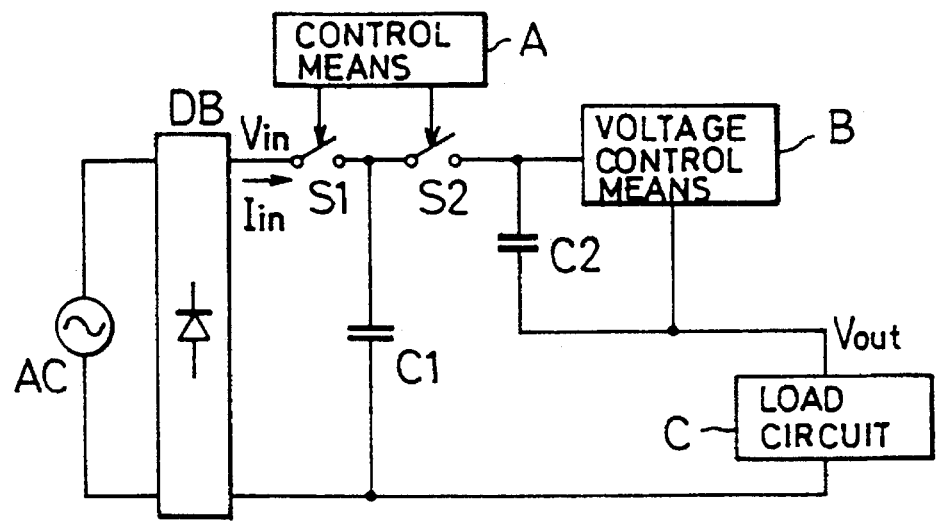
FIG. 1 is a schematic circuit diagram showing a first embodiment of the present invention.
Figure 2:
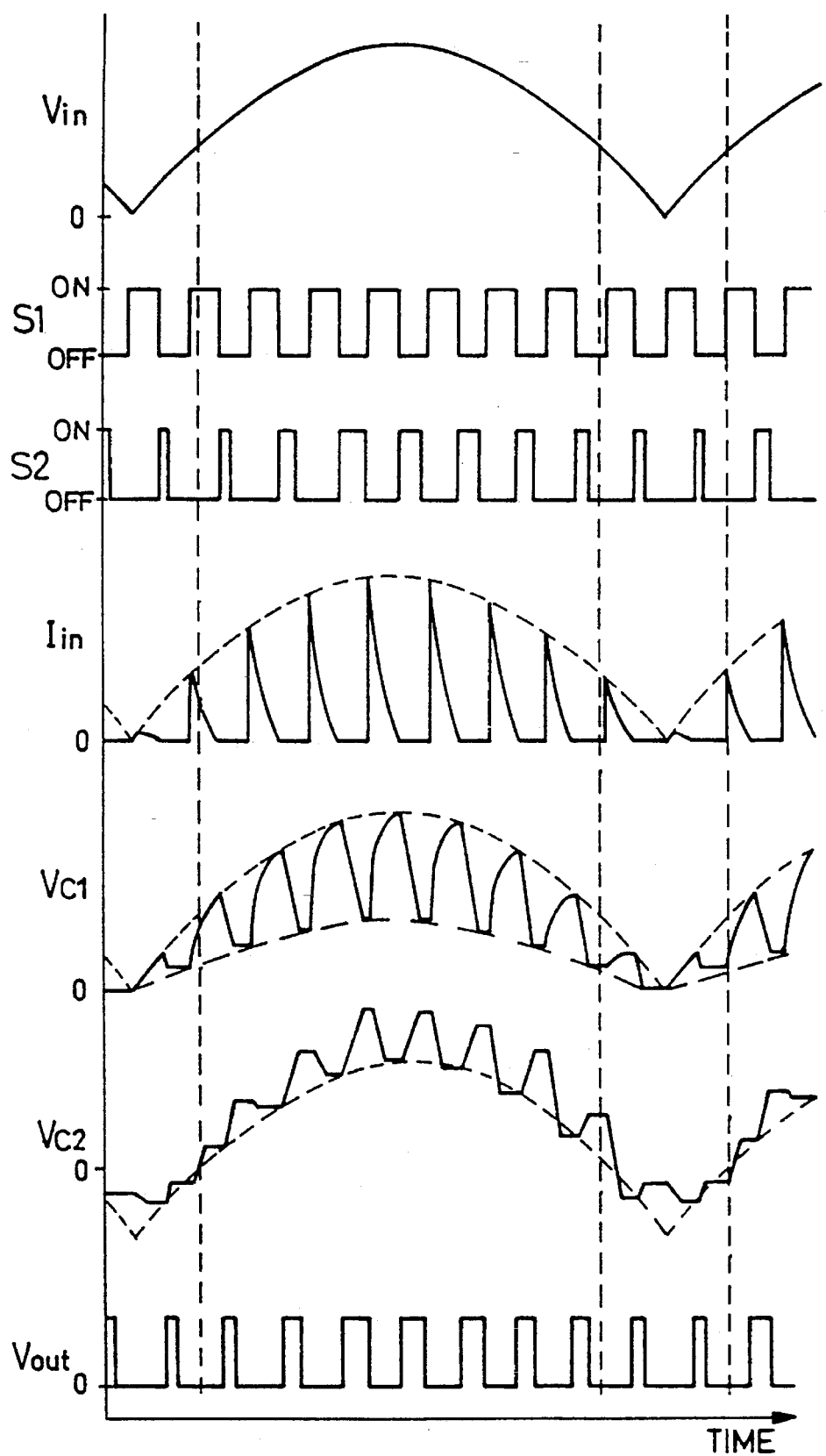
FIG. 2 is an operational waveform diagram for the first embodiment of FIG. 1.

1st Embodiment:

A first embodiment of the power source device according to the present invention is shown in the circuit diagram of FIG. 1 and in the operational waveform diagram of FIG. 2. Referring to the circuit arrangement of this first embodiment, a rectifier DB is connected to an alternating current power source AC, a series circuit of a switching element S1 and a capacitor C1 is connected to output ends of the rectifier DB, and a further series circuit of a capacitor C2 and a load circuit C is connected through a switching element S2 in parallel to the capacitor C1. Across the capacitor C2, a voltage control means B is connected for adjusting the capacitor voltage, while a control means A connected to the switching elements S1 and S2 for controlling a charging energy provided from the side of the power source to the capacitor C1 or a discharge energy supplied from the capacitor C1 to the load circuit, so as to adjust a voltage across the capacitor C1.

Figure 3A:
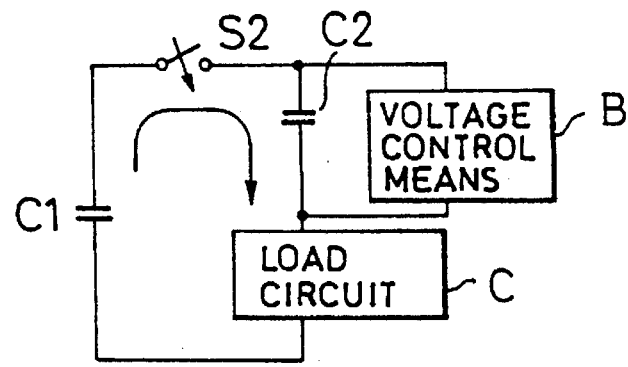
FIGS. 3A and 3B are schematic circuit diagrams for explaining the operation of the first embodiment of FIG. 1.
Figure 3B:
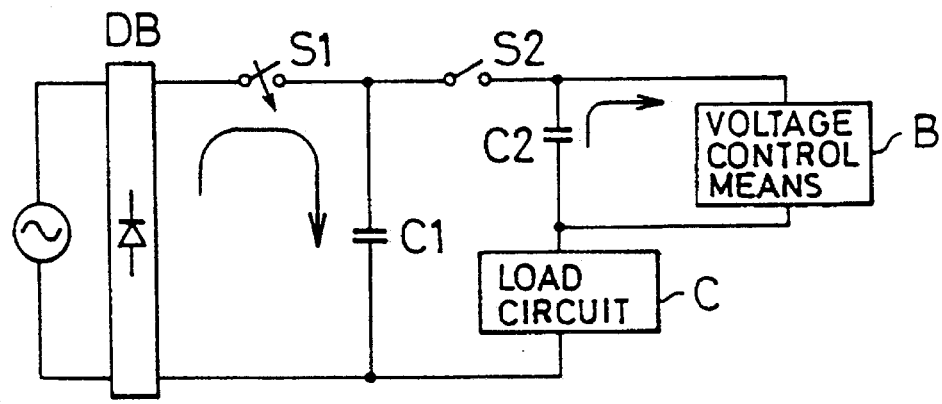

The operation of the first embodiment shall be explained next. First, in a state of FIG. 3B, the switching element S1 is turned ON by a control signal from the control circuit, and the capacitor C1 is charged up to the input voltage Vin. Next, in a state of FIG. 3A, the switching element S1 is turned OFF, the switching element S2 is turned ON, a series circuit of the capacitors C1 and C2 is connected to the load circuit C and part of the charge in the capacitor C1 is provided to the load circuit C. Then, in the state of FIG. 3B, the switching element S2 is turned OFF while the switching element S1 is turned ON, and the capacitor C1 is charged up to Vin. At the same time, the voltage of the capacitor C2 is adjusted to be at a predetermined voltage by the voltage control means B. The predetermined voltage at this time is substantially a differential voltage at the capacitor C2 between the input voltage Vin and the output voltage Vout, and the energy provided to the load circuit C is to be determined by the voltage control means B. To the load circuit C, the input voltage Vin is applied substantially up to its peak as the highest voltage. Further, in order that a residual voltage waveform after the discharge of the capacitor C1 to the load side will be similar to the waveform of Vin as a full-wave rectified output, an envelope of an input current waveform is made similar to an input voltage waveform by controlling ON time of the switching element S1 (or S2) with the control means A, and the input current distortion is thereby restrained.

It is made possible to restrain the input current distortion by so connecting as in the above the rectifier DB to the alternating current power source AC, the series circuit of the switching element S1 and capacitor C1 to the output ends of the rectifier, the series circuit of the capacitor C2 and load circuit C through the switching element S2 in parallel to the capacitor C1, and the voltage control means B to the capacitor C2 for adjusting its voltage, and controlling the residual voltage in the capacitor C1 with the control means A, and it is also made possible to render the respective capacitors and switching elements to be smaller by setting the operational frequency to be high. The small power source device which is capable of generating any optional constant voltage can be thereby realized.

Figure 4:
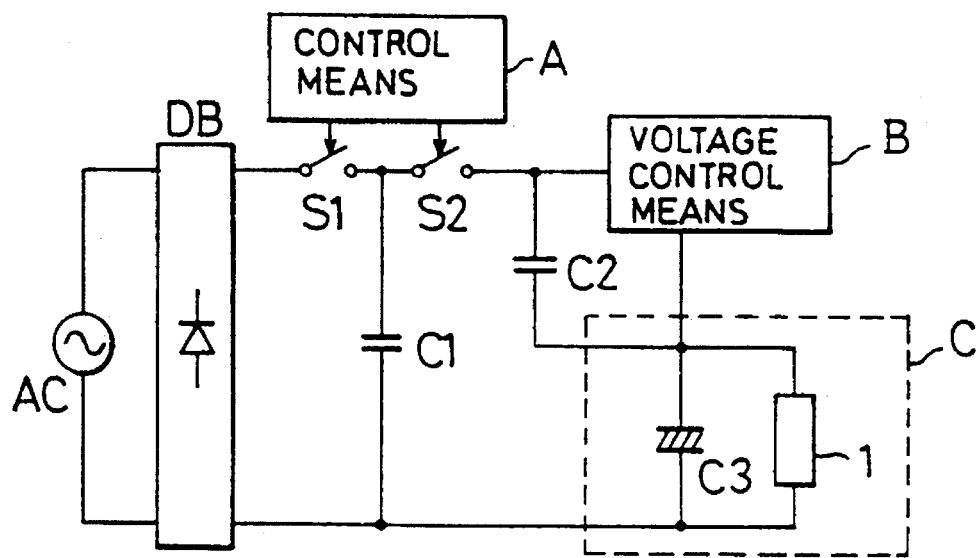
FIG. 4 is a schematic circuit diagram of a second embodiment of the present invention.

2nd Embodiment:

A circuit diagram of the second embodiment of the present invention is shown in FIG. 4. In the present embodiment, a parallel circuit of a smoothing capacitor 3 and load 1 is employed as the load circuit C, whereby it is made possible to supply to the load a substantially constant output voltage.

In this case, too, the input current distortion can be restrained in similar manner as in the above embodiment, and the capacitors and switch elements can be respectively made smaller by setting the operational frequency to be high. Consequently, the small power source device capable of generating the optional constant voltage can be realized.

Figure 5:
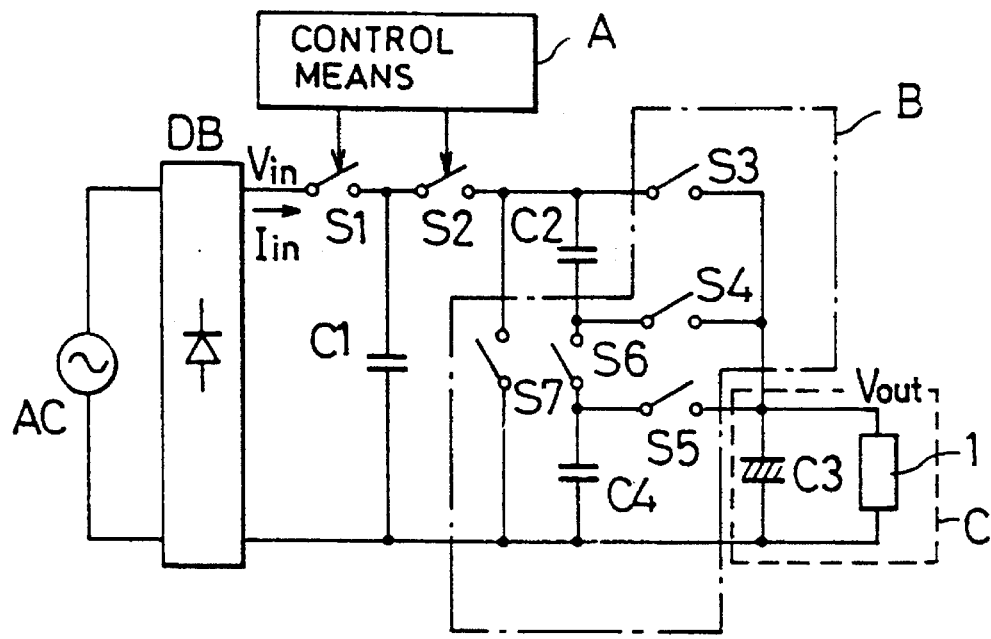
FIG. 5 is a schematic circuit diagram of a third embodiment of the present invention.
Figure 6:
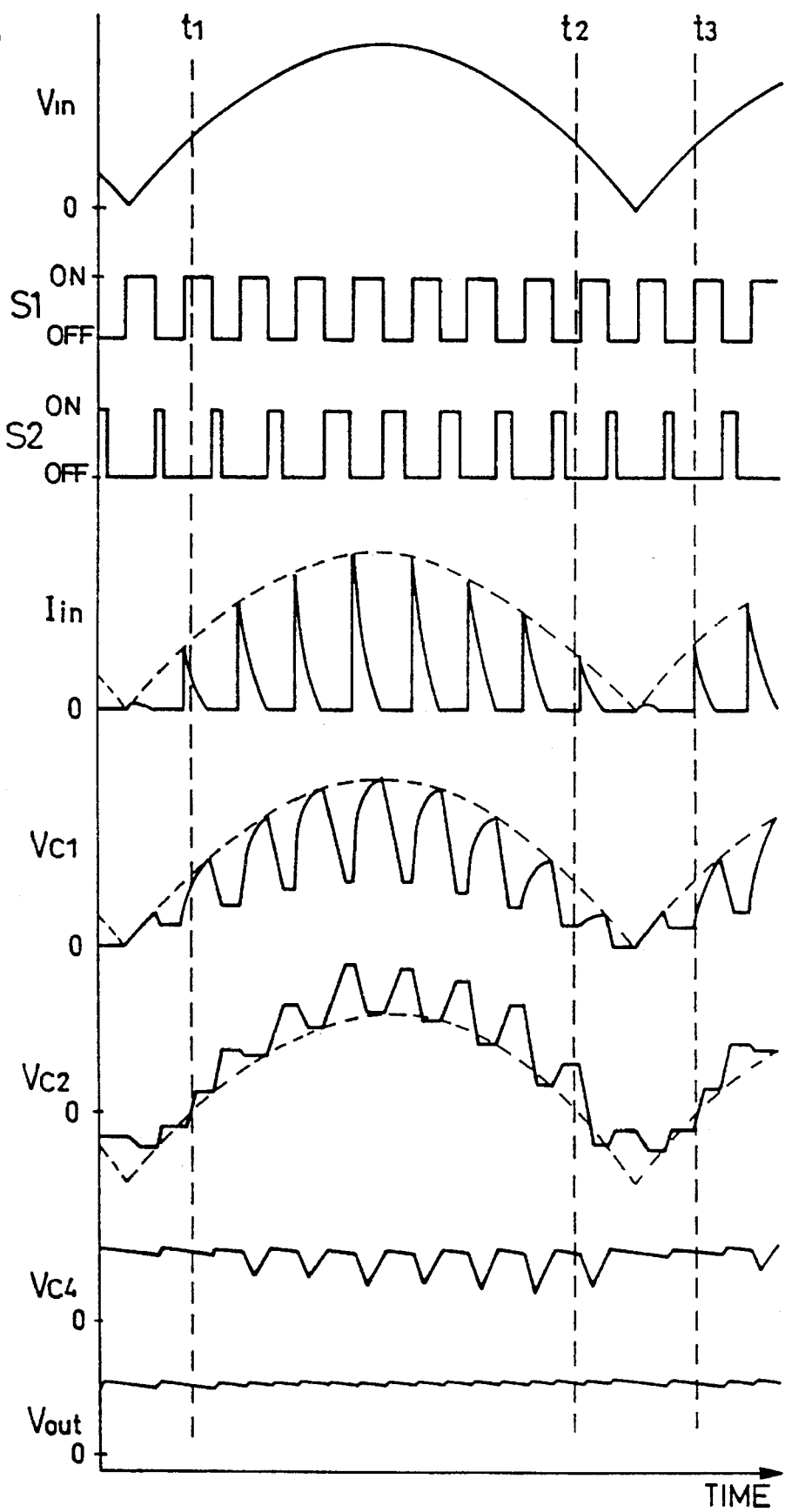
FIG. 6 is an operational waveform diagram for the third embodiment of FIG. 5.

3rd Embodiment:

A circuit diagram of the third embodiment of the present invention is shown in FIG. 5, and its operational waveform diagram is shown in FIG. 6. In the present embodiment, the rectifier circuit DB is connected to the alternating current source AC, the series circuit of the switching element S1 and capacitor C1 is connected to the output ends of the rectifier, the capacitor C2 is connected through the switching element S2 in parallel to the capacitor C1, and the parallel circuit of the capacitor C3 and load 1 is connected through the switching element S4. To the capacitor C2, the voltage control means B is connected for adjusting its voltage. As the voltage control means B, a circuit comprising a capacitor C4 and switching elements S3, S6, S5 and S7 is employed. Further, the control means A controls the charge amount from the source side to the capacitor C1 or the discharge amount from the capacitor C1 to the load side, for regulating the voltage at the capacitor C1. The operation thereof shall be described in the followings.

Figure 7A:
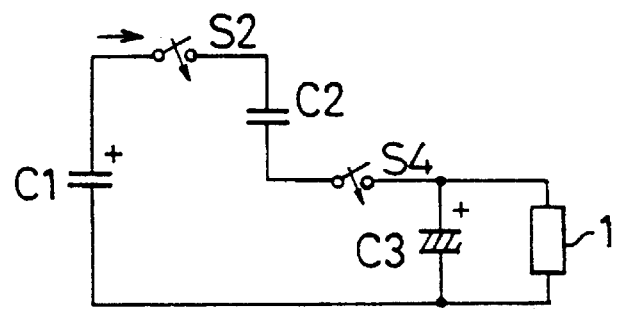
FIGS. 7A to 7E are schematic circuit diagrams for explaining the operation of the third embodiment of FIG. 5.
Figure 7B:
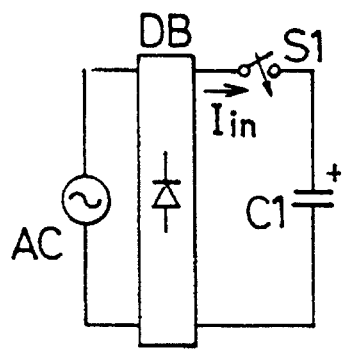
Figure 7C:
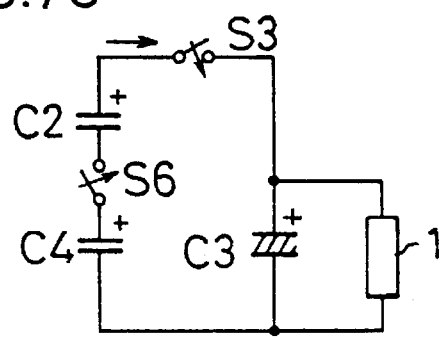
Figure 7D:
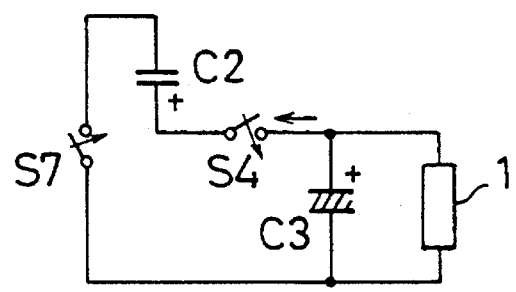
Figure 8:
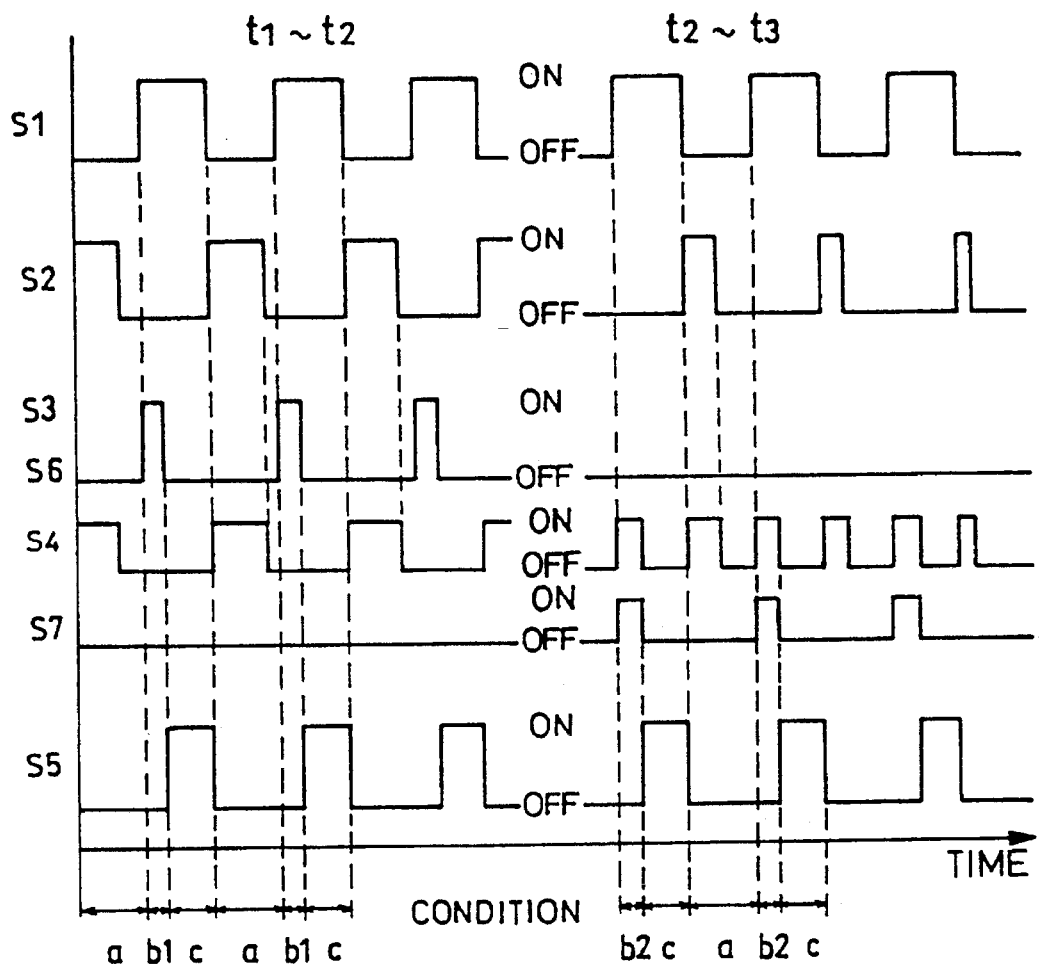
FIG. 8 is an operational waveform diagram for the third embodiment of FIG. 5.

First, in a state of FIG. 7A, the switching element S1 is turned ON by the control signal from the control means, and the capacitor C1 is charged up to Vin. Next, in a state of FIG. 7A, i.e., in a time period "a" of FIG. 8, the switching element S1 is turned OFF, the switching elements S2 and S4 are turned ON so that the series circuit of the capacitors C1 and C2 will be connected to the smoothing capacitor C3, the charge in the capacitor C1 is partly shifted to the smoothing capacitor C3 and is provided to the load 1 while charging the smoothing capacitor C3. Then, in a state of FIG. 7B where the switching elements S2 and S4 are turned OFF while the switching element S1 is turned ON, the capacitor C1 charged up to Vin. At the same time, in a period between a time t1 and a time t2 in FIG. 6, a state of FIG. 7C, i.e., a state in a time period "b1" of FIG. 8 is attained, where the switching elements S3 and S6 are made ON, a series circuit of the capacitors C2 and C4 is connected to the smoothing capacitor C3, and the charge in the capacitor C2 (and the capacitor C4) is partly moved to the smoothing capacitor C3 and is provided to the load 1 while charging the smoothing capacitor C3. In a period from a time t2 to a time t3 in FIG. 6, a state of FIG. 7D, i.e., a state in a time period "b2" in FIG. 8 is attained, where the switching elements S4 and S7 are made ON, the capacitor C2 is connected in parallel to the smoothing capacitor C3, and the charge in the smoothing capacitor C3 is partly moved to the capacitor C2 and is provided to the load 1 while charging the capacitor C2. The operation of the respective switching elements S1–S7 in periods between time t1 and time t2 and between time t2 and t3 is shown in FIG. 8.

Figure 7E:
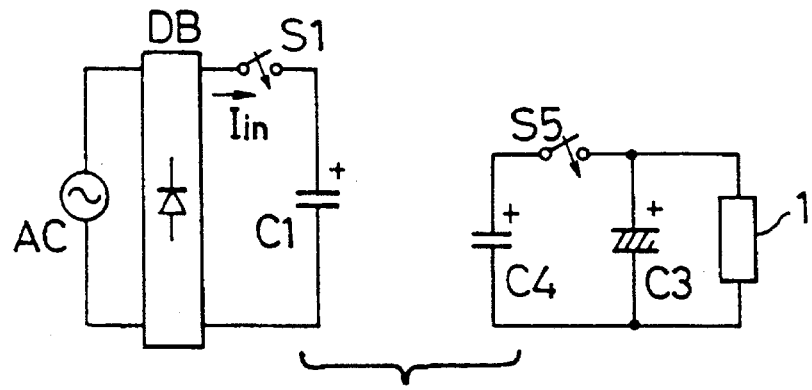

Next, in a state of FIG. 7E, i.e., in a period "c" of FIG. 8, the switching elements S3 and S6 (or S4 and S7) are made OFF while the switching element S5 is turned ON, the charge in the smoothing capacitor C3 is partly provided to the load 1 and capacitor C4, and the capacitor C4 and smoothing capacitor C3 will have an equal voltage. With this operation repeated, the voltages at the capacitor C4 and smoothing capacitor C3 are gradually increased, and these capacitors are charged up to a voltage determined by the ON period of the switching elements S3 and S6 (or S4 and S7). In the capacitor C2, a differential voltage between the input voltage Vin and the output voltage Vout is charged. The smoothing capacitor C3 charged substantially up to the peak of Vin as the highest voltage. Further, by controlling the ON period of the switching element S2 (or S1) so as to render the residual voltage waveform after the discharge of the capacitor C1 to the load side to be similar to the waveform of Vin as the full wave rectified output, the envelope of the input current waveform is made similar to the input power waveform, and the input current distortion is restrained.

As in the above, it is made possible to restrain the input current distortion by connecting the rectifier DB to the alternating current power source AC, the series circuit of the switching element S1 and capacitor C1 to the output ends of the rectifier, the capacitor C2 through the switching element S4 in parallel to the capacitor C1, the parallel circuit of the smoothing capacitor C3 and load 1 through the switching element S4, and the voltage control means B to the capacitor C2 for adjusting its voltage, and controlling the residual voltage in the capacitor C1 by the control means A. Further, as the respective capacitors and switching elements can be made small by setting the operational frequency to be high, a small power source device capable of generating any optional constant voltage can be provided.

Figure 9:
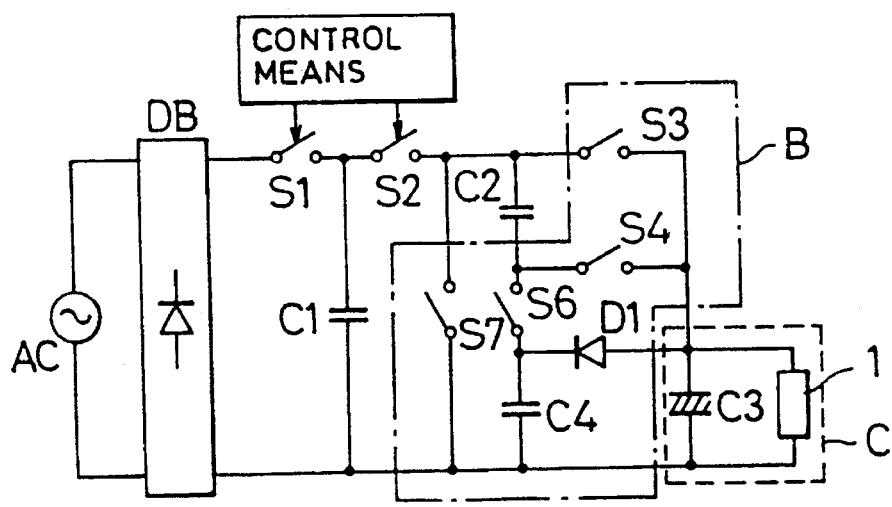
FIG. 9 is a circuit diagram showing a fourth embodiment of the present invention.

4th Embodiment:

FIG. 9 is a circuit diagram of the fourth embodiment of the present invention. In the present embodiment, the switching element S5 in FIG. 5 is replaced by a diode D1.

Figure 10:
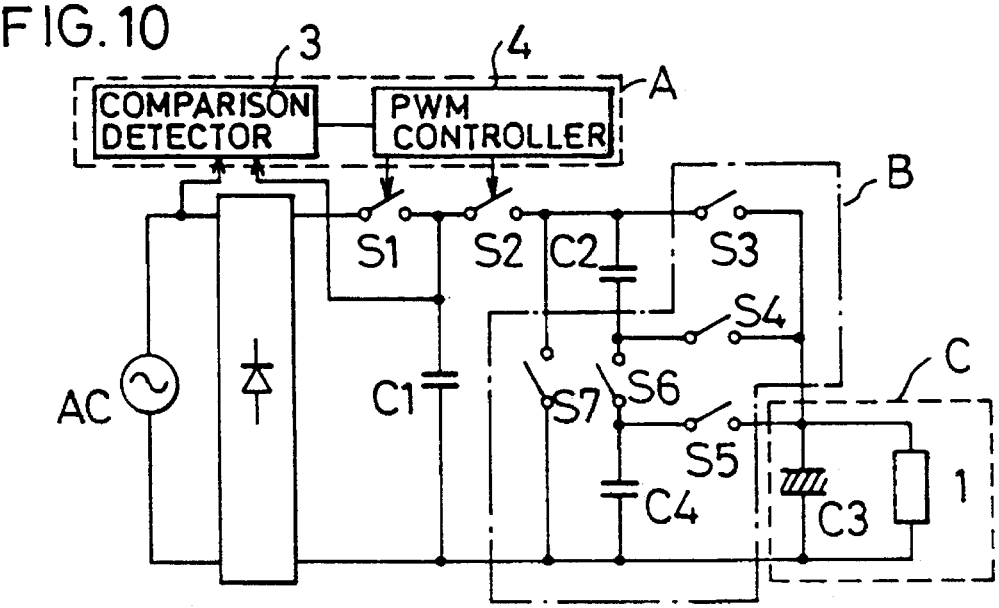
FIG. 10 is a circuit diagram showing a fifth embodiment of the present invention.

5th Embodiment:

FIG. 10 is a circuit diagram showing the fifth embodiment of the present invention, in which the switching control is performed by providing, in the control means A, the input voltage and the voltage at the capacitor C1 into a comparison detector 3 and a detector output is input into a PWM (pulse width modulation) controller 4, whereby it is made possible to cope with a fluctuation in the input voltage.

For the operation, remarkable deviation of the input voltage from a predetermined value is detected by the comparison detector 3, and its detection signal is input into the PWM controller 4 to determine the ON period of the switching element S1 or S2. When the input voltage is lowered, the voltage at the capacitor C1 is decreased by shortening (extending) the ON period of the switching element S1 (or S2) and reducing (or increasing) the charge amount to the capacitor C1 (or the discharge amount from C1), and the adjustment is so made as to be able to have the same input current as in normal operation led in. In an event when the input voltage is elevated, the operation may be performed in opposite manner.

With the switching control of the control means A executed by inputting the input voltage and the voltage at the capacitor C1 into the comparison detector 3 and its output into the PWM controller 4, the input current distortion can be restrained even with respect to any fluctuation in the input voltage, and the respective capacitors and switching elements can be made smaller by setting the operational frequency to be high, so that the small power source device capable of generating any optional constant voltage can be provided.

Figure 11:
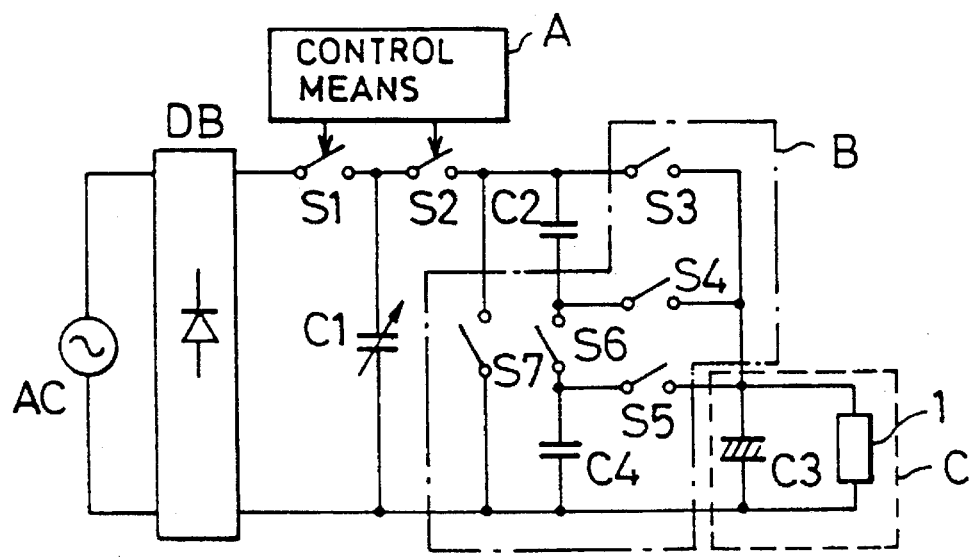
FIG. 11 is a circuit diagram showing a sixth embodiment of the present invention.

6th Embodiment:

FIG. 11 is a circuit diagram of the sixth embodiment of the present invention, in which a variable volume capacitor is employed as the capacitor C1 so that the voltage of the capacitor C1 may be controlled.

Figure 12:
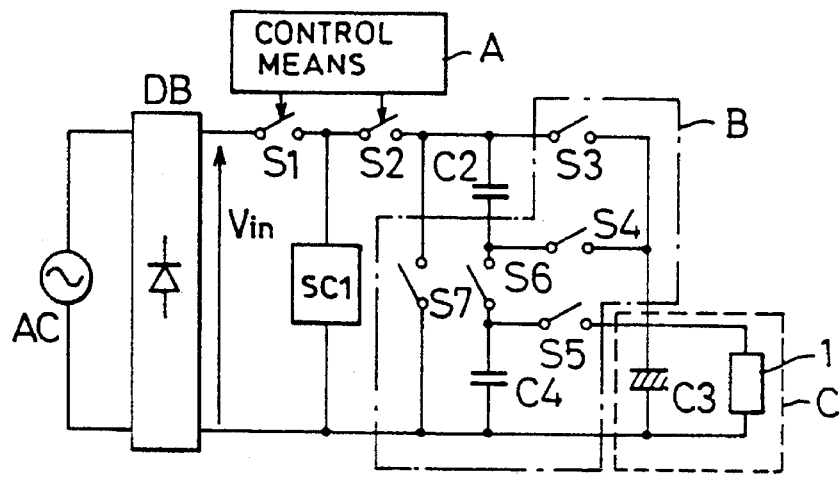
FIG. 12 is a circuit diagram showing a seventh embodiment of the present invention.
Figure 13A:
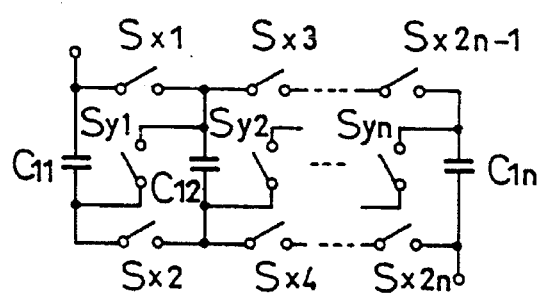
FIGS. 13A and 13B are a fragmentary circuit diagram of a part employed in the seventh embodiment of FIG. 12 and an operational waveform diagram of the part of FIG. 13A.
Figure 13B:
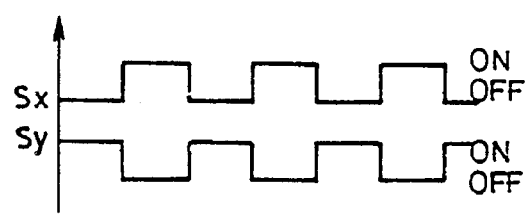
Figure 13C:
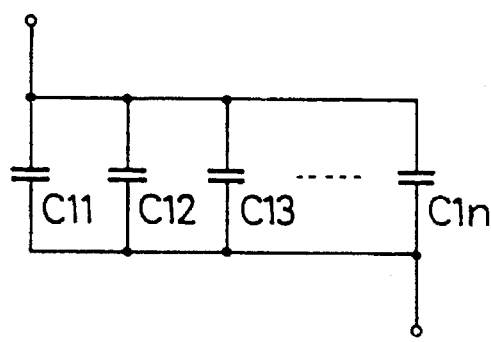
FIGS. 13C and 13D are schematic circuit diagrams for explaining the operation of the part shown in FIG. 13A.
Figure 13D:
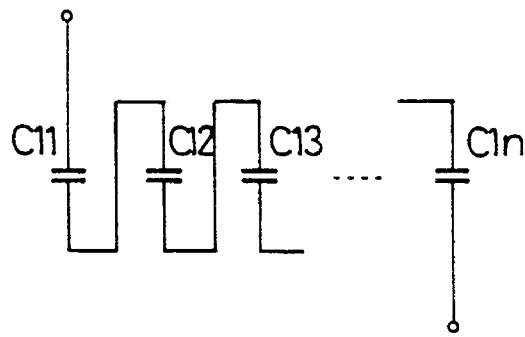

7th Embodiment:

In FIG. 12, a circuit diagram of the seventh embodiment of the present invention is shown, in which a basic arrangement of the main circuit is such that the rectifier DB is connected to the alternating current source AC, and a series circuit of the switching element S1 and such switched capacitor circuit SC1 as shown in FIG. 13A is connected to the output ends of the rectifier. This switched capacitor circuit SC1 is to turn its switching elements alternately ON and OFF as shown in FIG. 13B. The capacitor C2 is connected through the switching element S2 in parallel to the switched capacitor circuit SC1, and the voltage control means B is connected to the capacitor C2 for adjusting its voltage. Further, the control means A is to control the charge amount provided from the power source side to the switched capacitor circuit SC1 in response to the input voltage Vin or the discharge amount supplied from the switched capacitor circuit SC1 to the load side, so as to adjust the voltage of the respective capacitors in the switched capacitor circuit SC1. When the switching element S1 is turned ON by the control signal from the control means A and the switching elements Sx in the switched capacitor circuit SC1 are made to turn ON interlocking therewith, then the switched capacitor circuit SC1 will be in such state as shown in FIG. 13C, and the respective capacitors in the switched capacitor circuit SC1 are charged up to the peak of Vin. When the switching elements Sx and Sy in the switched capacitor circuit SC1 are made to turn ON and OFF respectively as interlocked with the turning OFF of the switching element S1 and the turning ON of the switching elements S2 and S4, the switched capacitor circuit SC1 will be in such state as shown in FIG. 13D, and the switched capacitor circuit SC1 provides a voltage n times as large as the input voltage Vin. Accordingly, the smoothing capacitor C3 is to be charged substantially to a level n times as high as the peak of the input voltage Vin as the highest voltages. In the present embodiment, too, any input voltage distortion can be controlled by controlling the residual voltage at the respective capacitors in the switched capacitor circuit SC1 by the control means and, as the respective capacitors and switching elements can be minimized in size as a result of the setting of the operational frequency, a small power source device capable of generating any optional constant voltage can be provided.

Figure 14:
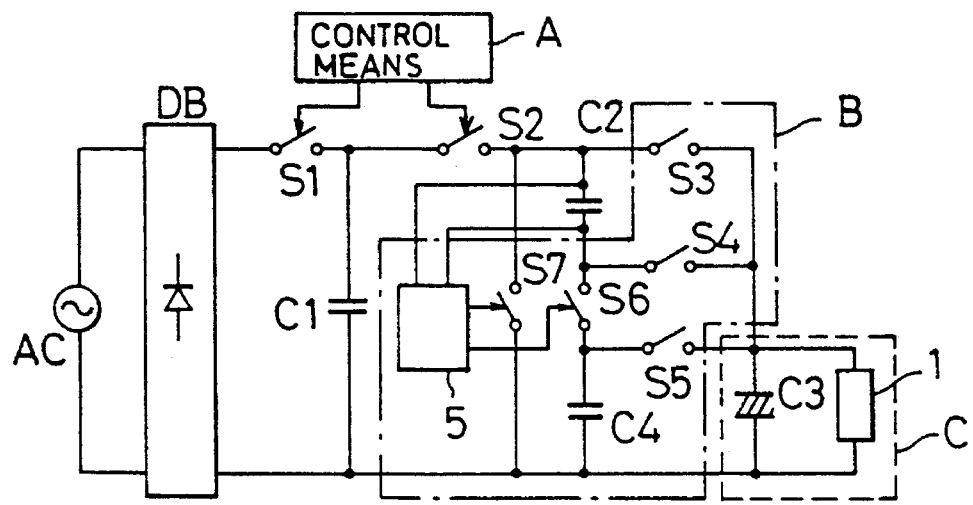
FIG. 14 is a circuit diagram showing an eighth embodiment of the present invention.

8th Embodiment:

FIG. 14 is a circuit diagram of the eighth embodiment of the present invention, in which the voltage at the capacitor C2 is detected and input into a PWM controller 5, so that the switching element S3 or S6 is controlled in the period t1–t2 of FIG. 5 and the switching element S4 or S7 in the period t2–t3. More specifically, the voltage at the capacitor C2 is detected and compared with the voltage at the capacitor C2 as a reference voltage for the purpose of applying to the load a constant voltage. In the state of FIG. 7C (7D), the switching elements S3 and S6 (or S4 and S7) are turned ON, to have the voltage adjust of the capacitor C2 started. Here, a signal at the moment when the voltage of the capacitor C2 coincides with the reference voltage is detected, and this signal is used for performing a control of turning OFF the switching element S3 or S6 (or S4 or S7). In this manner, the voltage control of the capacitor C2 is carried out, and a constant voltage can be supplied to the load in the state of FIG. 7A.

Figure 15:
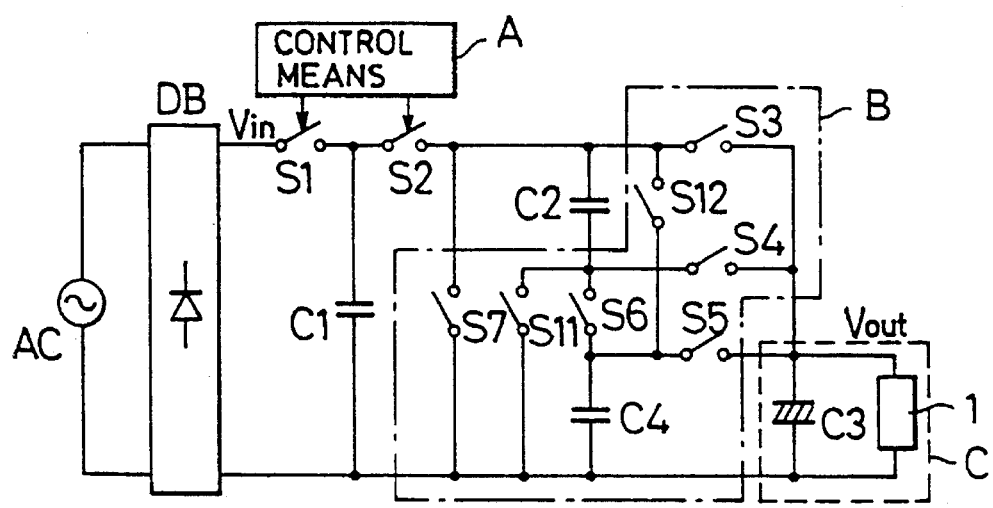
FIG. 15 is a circuit diagram showing a nineth embodiment of the present invention.
Figure 16:
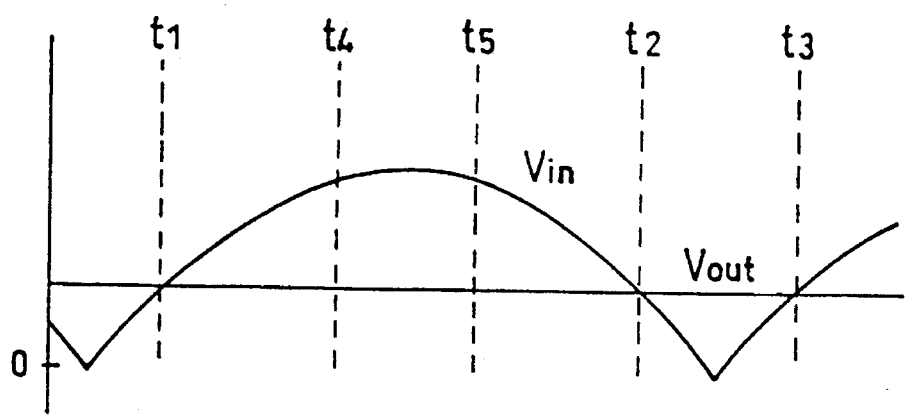
FIG. 16 is an explanatory waveform diagram for a switching element in the nineth embodiment of FIG. 15.
Figure 17:
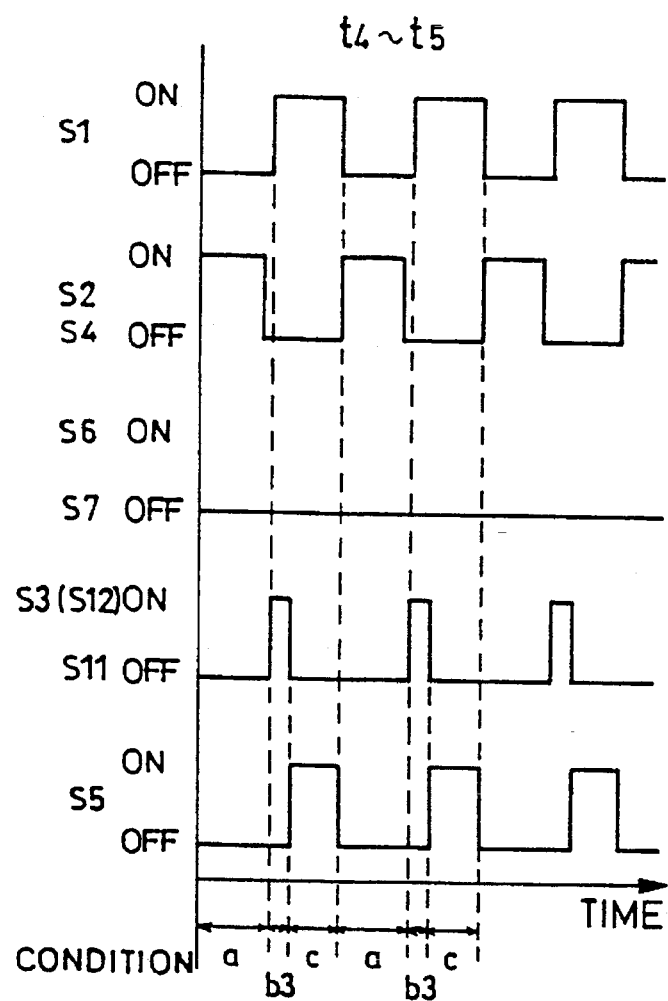
FIG. 17 is an explanatory waveform diagram for the nineth embodiment of FIG. 15.
Figure 18:
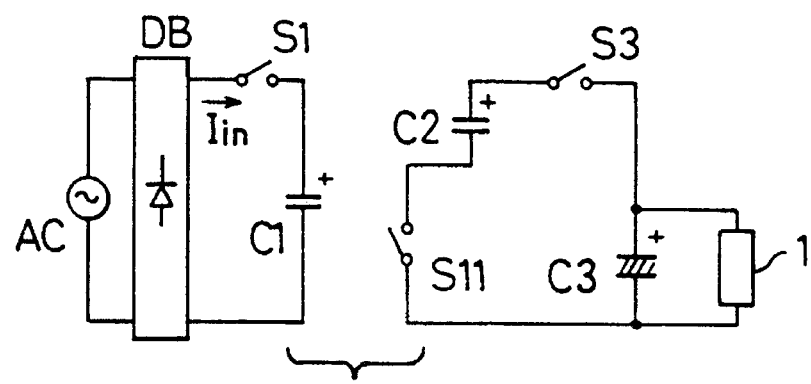
FIG. 18 is a schematic circuit diagram for explaining the operation of the nineth embodiment of FIG. 15.

9th Embodiment:

A circuit diagram of the nineth embodiment of the present invention is shown in FIG. 15, which embodiment is to add to the main circuit a switching element S11 so that the respective switching elements will be actuated as shown in FIG. 17 in such period of time t4–t5 as shown in FIG. 16. By turning the switching elements S3 and S11 ON as in FIG. 18 in a period b3 of FIG. 17, any voltage difference between the capacitor C2 and the smoothing capacitor C3 is minimized, and the voltage adjustment of the capacitor C2 can be performed efficiently.

Figure 19:
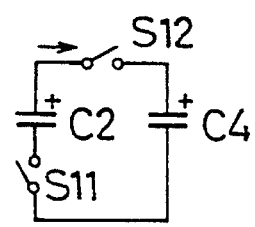
FIG. 19 is a fragmentary circuit diagram for explaining the operation of the nineth embodiment of FIG. 15.

Further, by turning the switching elements S11 and S12 ON as in FIG. 19 in the period b3 of FIG. 17, it is made possible to minimize the voltage difference between the capacitors C2 and C4 and to provide the energy of the capacitor C2 to the capacitor C4, so that the voltage adjustment of the capacitor C2 can be efficiently performed. In this case, too, the input current distortion can be controlled and the respective capacitors and switching elements can be made smaller by setting the operational frequency to be high, so that the small power source device capable of generating the optional constant voltage can be provided.

Figure 20:
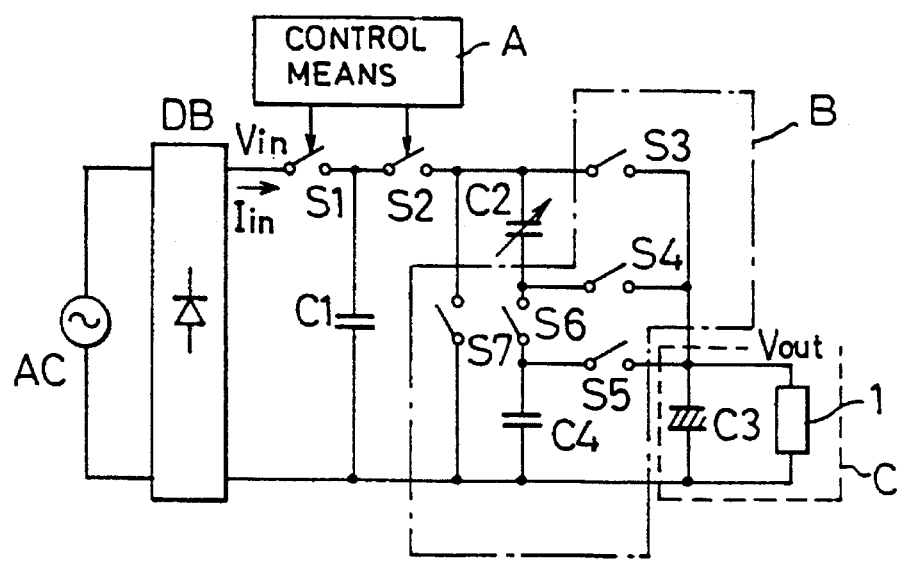
FIG. 20 is a circuit diagram showing a tenth embodiment of the present invention.

10th Embodiment:

FIG. 20 is a circuit diagram of the tenth embodiment of the present invention, in which a variable volume capacitor is connected as the capacitor C2 in FIG. 5, the switching elements S3 and S6 are turned ON in the period b1 of the time t1–t2 as shown in FIG. 8, the volume of the capacitor C2 is increased, the volume of the capacitor C1 is varied so as to minimize the voltage difference between the series circuit of capacitors C2 and C4 and the smoothing capacitor C3, the charge of the capacitor C2 is partly provided to the smoothing capacitor C3 and load 1, and the voltage adjustment of the capacitor C2 can be efficiently performed.

Figure 21:
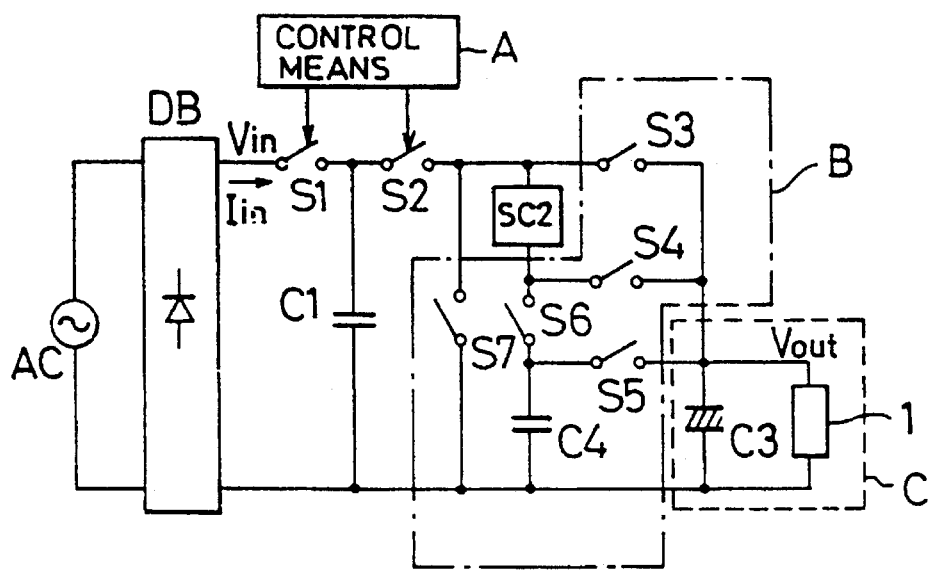
FIG. 21 is a circuit diagram showing an eleventh embodiment of the present invention.

11th Embodiment:

FIG. 21 is a circuit diagram of the eleventh embodiment of the present invention, in which such switched capacitor circuit SC2 as shown in FIG. 13A is connected in place of the capacitor C2. In the period "a" shown in FIG. 8, the switching elements Sy are made ON while the switching elements Sx are turned OFF as shown in FIG. 13B, the switching elements S3 and S6 are made ON in the period b1 of the foregoing time t1–t2 and, as interlocked therewith, the switching elements Sx are made ON while the switching elements Sy are turned OFF as shown in FIG. 13B, so that the voltage of the capacitor C2 will be dropped and the voltage adjustment for the capacitor C2 will be efficiently performed. In these embodiment, too, the input current distortion can be controlled similarly to the embodiment of FIG. 5, the capacitors and switching elements can be made smaller respectively by setting the operational frequency to be high, and it is made possible to provide the small power source device capable of generating the optional constant voltage can be provided.

Figure 22:
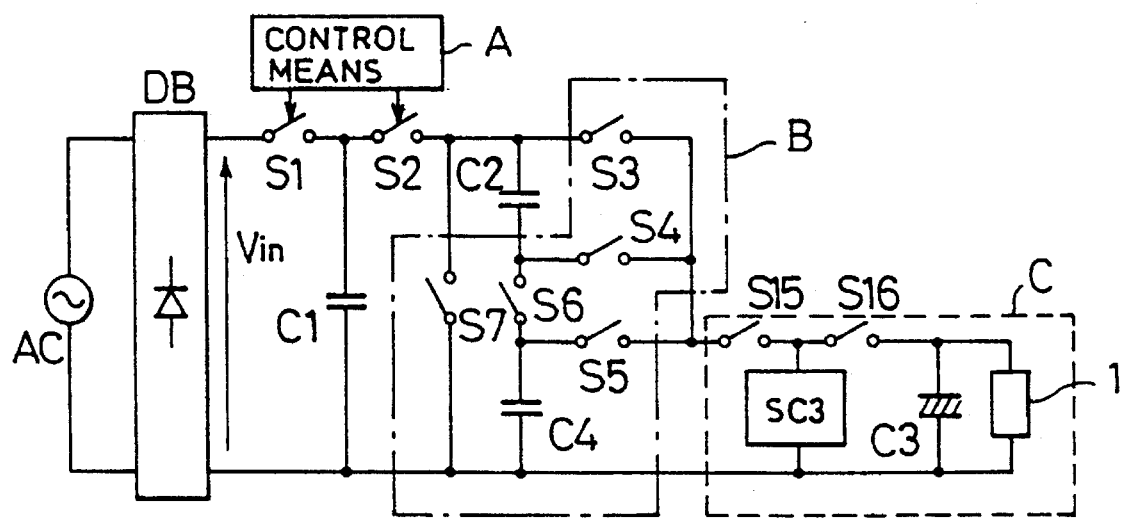
FIG. 22 is a circuit diagram showing a twelveth embodiment of the present invention.
Figure 23:
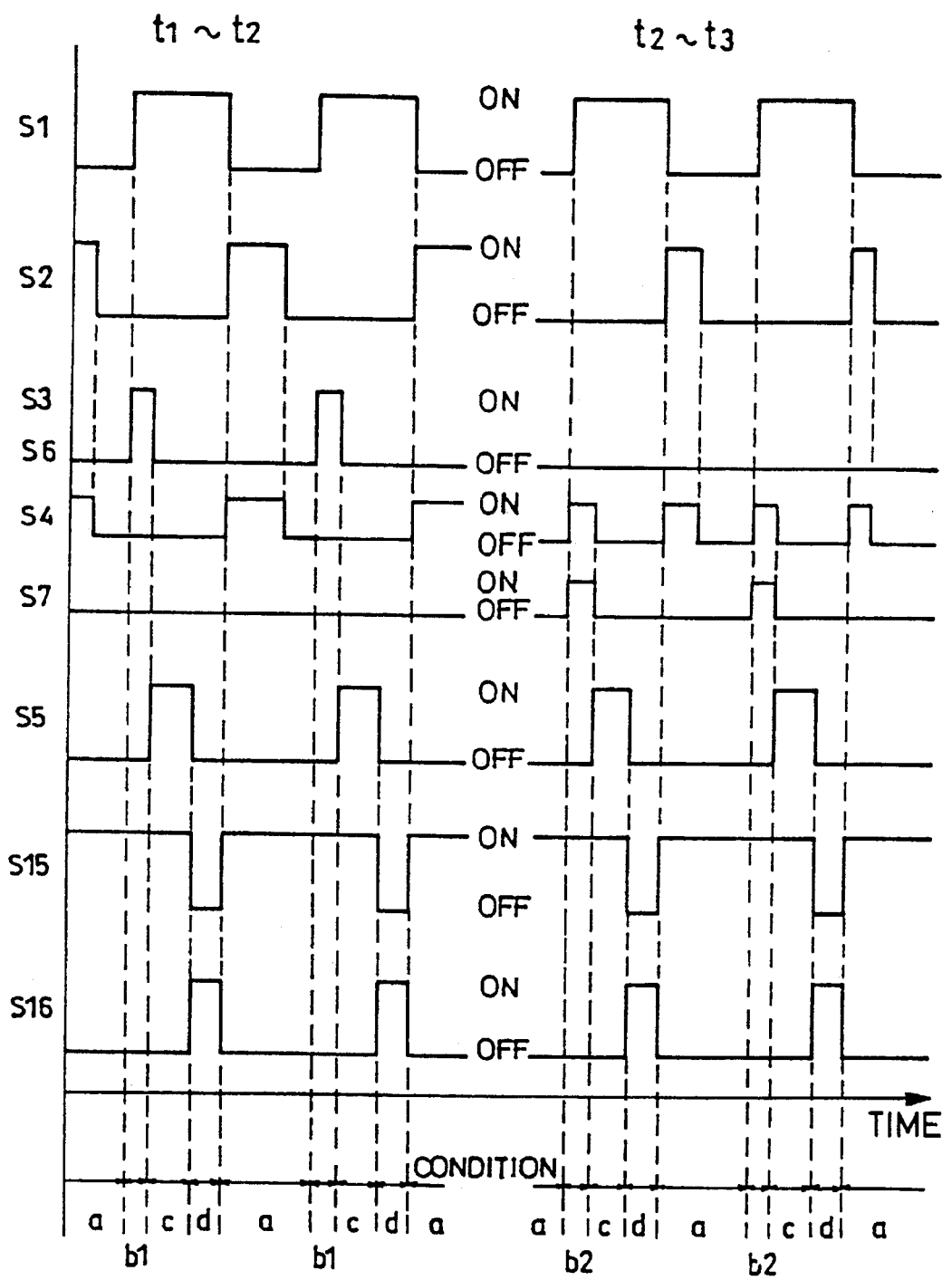
FIG. 23 is an explanatory waveform diagram for the twelveth embodiment of FIG. 22.
Figure 24A:
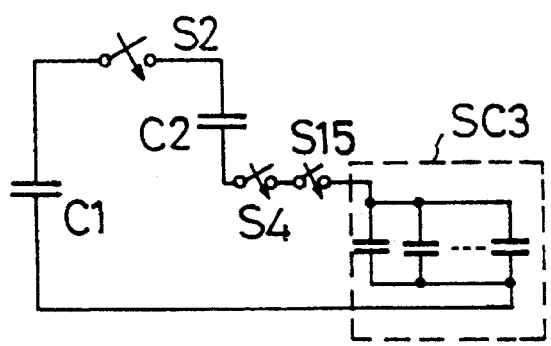
FIGS. 24A through 24H are schematic circuit diagrams for explaining the operation of the twelveth embodiment of FIG. 22.
Figure 24B:
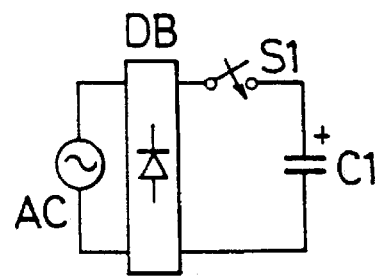
Figure 24C:
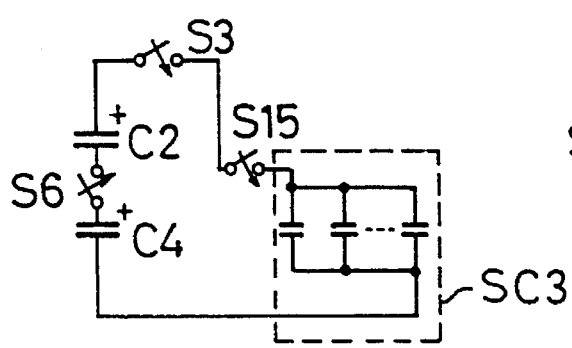
Figure 24D:
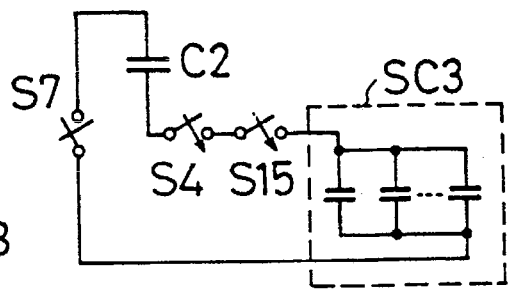
Figure 24E:
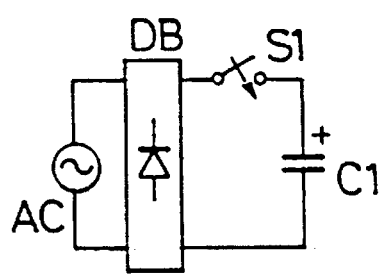
Figure 24F:
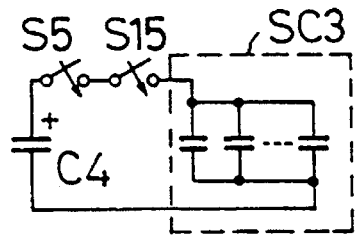
Figure 24G:
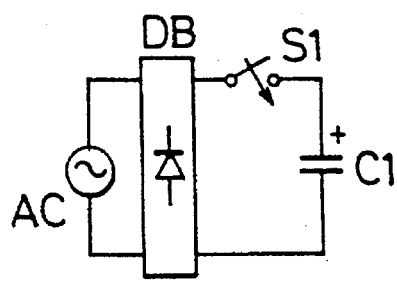
Figure 24H:
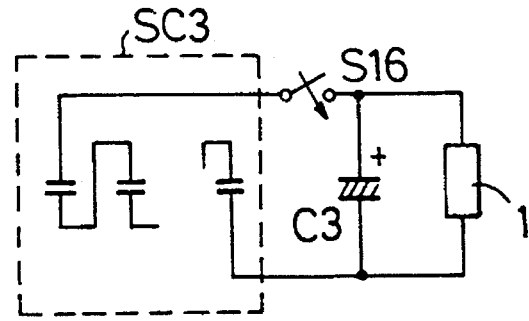

12th Embodiment:

A circuit diagram of the twelveth embodiment of the present invention is shown in FIG. 22 and its operational waveforms are shown in FIG. 23. This embodiment employs, as the load circuit C, a circuit comprising switching elements S15 and S16, switched capacitor circuit SC3 and load 1.

The operation of the present embodiment shall be described in the followings. As the switching element S1 is turned ON by the control signal from the control means A, the capacitor C1 is charged up to the input voltage Vin. Next, as the switching element S1 turns OFF while the switched capacitor circuit SC3 turns into the parallel state and the switching elements S2, S4 and S15 are turned ON as in a state "a" of FIG. 23, then the series circuit of the capacitors C1 and C2 is connected to the switched capacitor circuit SC3, the charge in the capacitor C2 is partly moved to the switched capacitor circuit SC3, and thereby the circuit SC3 is charged. Next, the switching elements S2 and S4 are turned OFF but the switching element S1 is turned ON as in a state "b" of FIG. 23, then the capacitor C1 is charged up to the input voltage Vin. At the same time, in the period of the time t1–t2, the switching elements S3 and S6 are made ON as in a state "b1" of FIG. 23, the series circuit of the capacitors C2 and C4 is thereby connected to the switched capacitor circuit SC3, the charge in the capacitors C2 (and C4) is partly moved to the switched capacitor circuit SC3, and thereby the circuit SC3 is charged. In a period of time t2–t3, the switching elements S4 and S7 are turned ON as in a state b2 of FIG. 23, the capacitor C2 is connected in parallel to the switched capacitor circuit SC3 to have the charge in the switched capacitor circuit SC3 moved partly to the capacitor C2, and this capacitor C2 is charged. Next, the switching elements S2 and S3 (or S4 and S7) are turned OFF while the switching element S5 is made ON, as in a state "c" of FIG. 23, the charge in the switched capacitor circuit SC3 is partly moved to the capacitor C4, and the voltages of the capacitor C4 and of the respective capacitors in the switched capacitor circuit SC3 are equalized. Next, as the switching element S15 is made OFF but the switching element S16 is turned ON as in a state "d" of FIG. 23, the switched capacitor circuit SC3 interlocks therewith to be in the series state, and a voltage n times high is provided to the load side. In this manner, it is made possible to apply to the load a voltage above the input voltage Vin.

Figure 25:
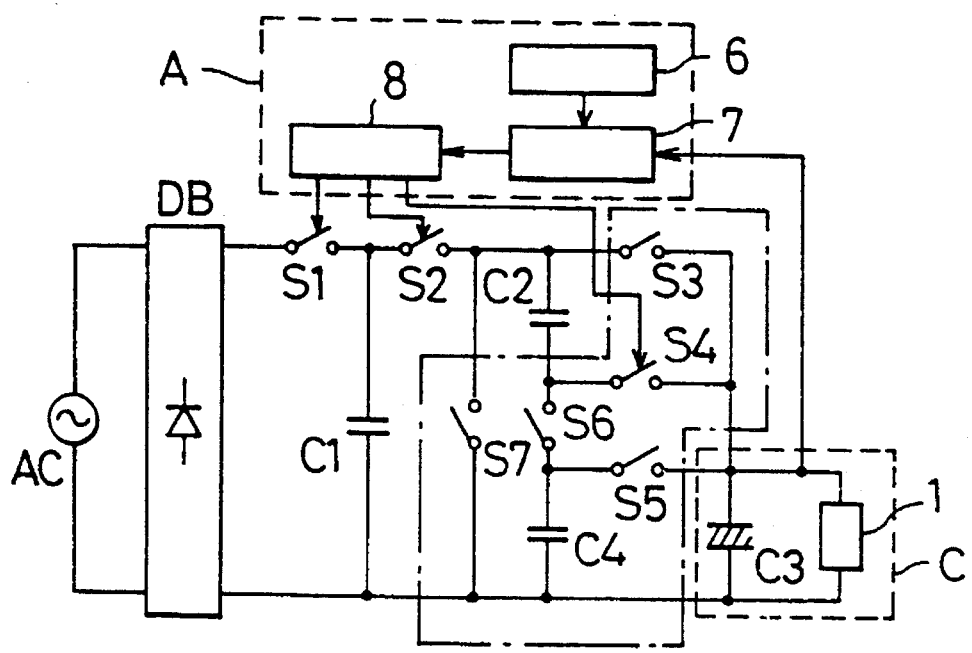
FIG. 25 is a circuit diagram showing a thirteenth embodiment of the present invention.

13th Embodiment:

FIG. 25 is a circuit diagram of the thirteenth embodiment of the present invention, in which a stabilization of the output voltage is contrived by detecting the output voltage of the load 1, providing the detected voltage and an output of a reference voltage circuit 6 into a comparison circuit 7, providing its output into a PWM controller 8, and thereby controlling the switching element S1 or S2. Then, it is made possible to vary the output voltage by varying the output of the reference voltage circuit 6 or varying at a fixed ratio the width of pulse signals provided to the switching elements. Since in this embodiment, too, the input current distortion can be controlled through the control of the residual voltage at the capacitor C1 and the respective capacitors and switching elements can be made smaller by setting the operational frequency to be high, it is made possible to provide the small power source device capable of generating the optional constant voltage.

Figure 26:
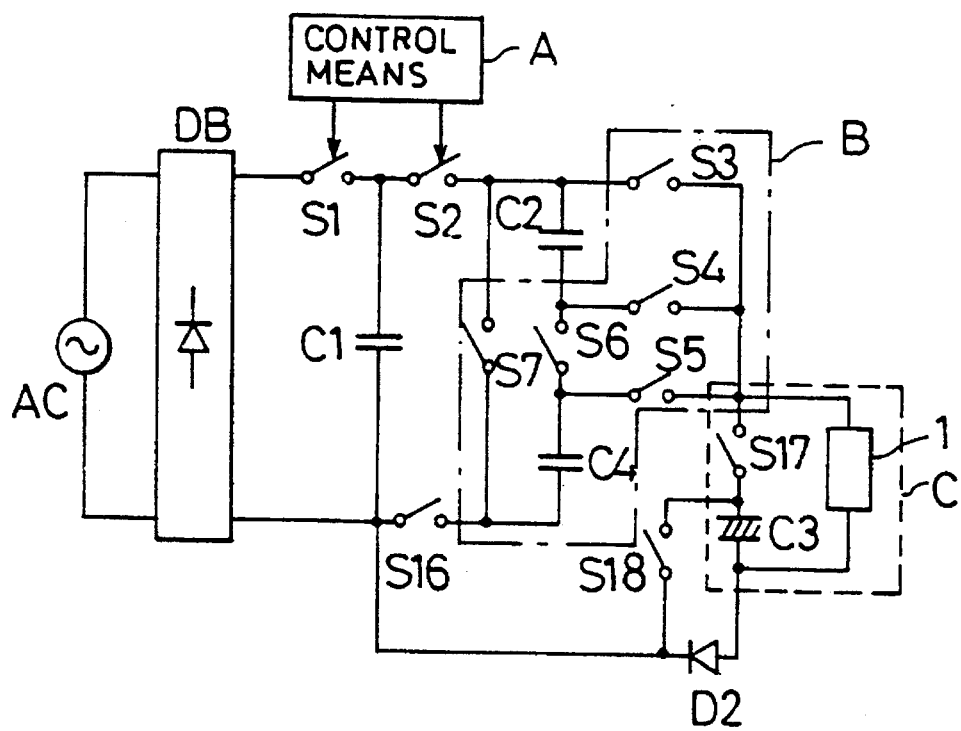
FIG. 26 is a circuit diagram showing a fourteenth embodiment of the present invention.
Figure 27A:
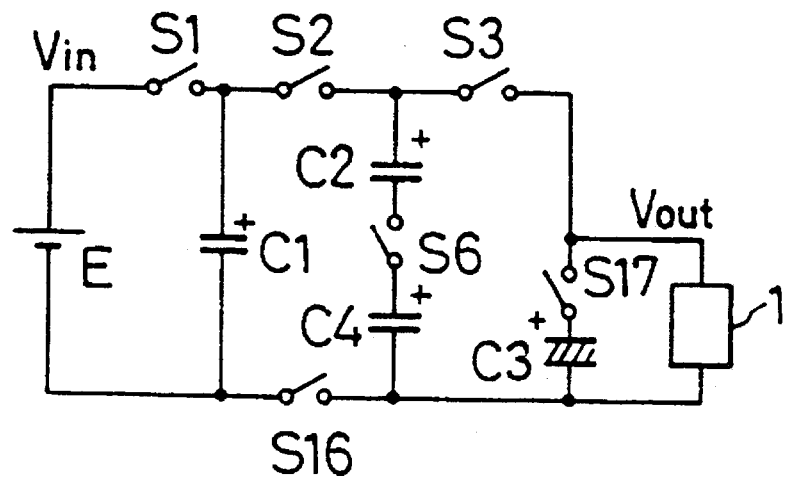
FIGS. 27A and 27B are schematic circuit diagrams for explaining the operation of the fourteenth embodiment of FIG. 26.
Figure 27B:
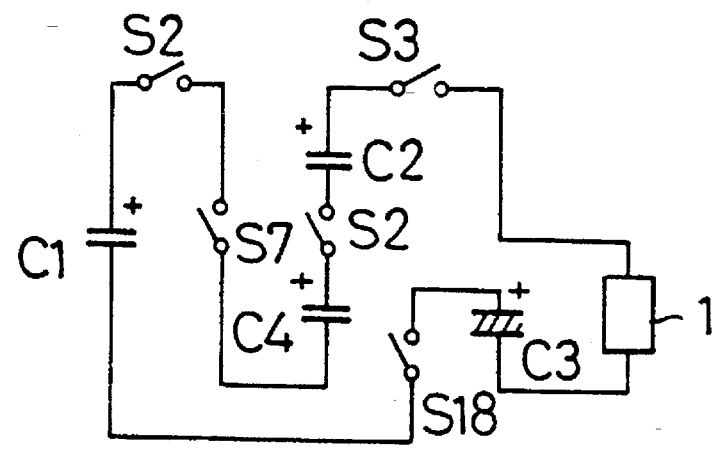
Figure 28:
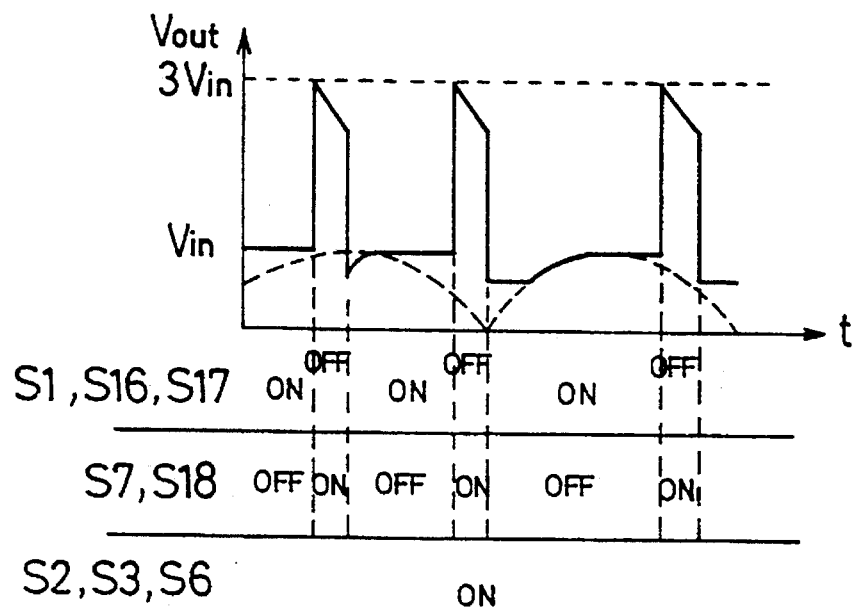
FIG. 28 is an operational waveform diagram for the fourteenth embodiment of FIG. 26.

14th Embodiment:

FIG. 26 is a circuit diagram of the fourteenth embodiment of the present invention, and FIGS. 27A, 27B and 28 are explanatory views for its operation. In this embodiment, the rectifier DB is connected to the alternating current source AC, a series circuit of the switching element S1 and capacitor C1 is connected to the output ends of the rectifier, the capacitor C2 is connected through the switching element S2 in parallel to the capacitor C1, and a parallel circuit of the load 1 and a series circuit of a switching element S17 and smoothing capacitor C3 is connected through the switching element S4 to the capacitor C2 and through the diode D2 to a grounding side of the rectifier DB. Further, the voltage control means B is connected to the capacitor C2 for adjusting its voltage and, through a switching element S16, to the grounding side of the rectifier DB. Further, a switching element S18 is connected between a connecting point of the switching element S17 to the smoothing capacitor C3 and the grounding side of the rectifier. As the voltage control means B for the capacitor C2 in FIG. 26, the circuit comprising the capacitor C4 and switching elements S3, S5, S6 and S7 is employed. Further, the voltage at the capacitor C1 is adjusted by controlling the charge amount from the source side to the capacitor C1 in response to the input voltage Vin or the discharge amount fed from the capacitor C1 to the load side by means of the switching elements S1 and S2.

With the switching elements S1–S3, S6, S16 and S17 made ON upon connection to the power source, the series circuit of the capacitor C2 and C4, the smoothing capacitor C3 and capacitor C1 are charged up to the input voltage Vin, while the input voltage Vin is applied to the load 1. Next, as the switching elements S1, S16 and S17 are made OFF while the switching elements S7 and S18 are made ON, with the switching elements S2, S3 and S6 left to be ON, a voltage of 3 Vin is to be supplied to the load 1. In this way, it is made possible to momentarily apply a high voltage to the load 1. With this arrangement, made possible to cope with such load as the discharge lamp which requires a preheating power and a starting voltage and, after the starting, a constant voltage can be supplied to the load by restoring the normal operation. Further, by setting the operational frequency to be high, the respective capacitors and switching elements can be made smaller, and it is made possible to provide the small power source device capable of generating the optional constant voltage.

Figure 29:
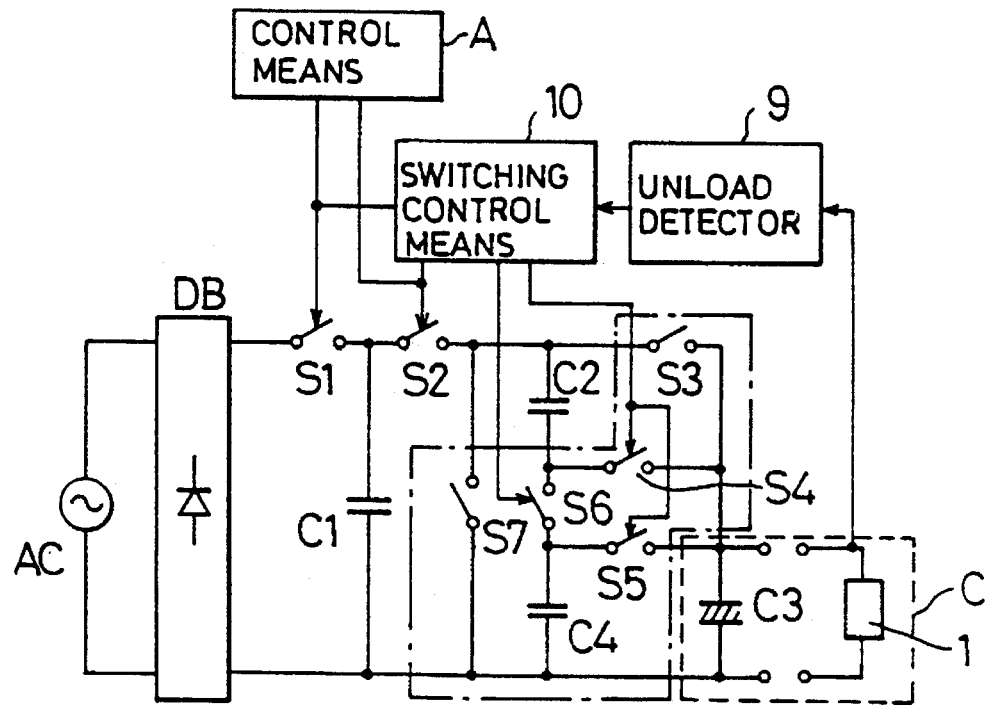
FIG. 29 is a circuit diagram showing a fifteenth embodiment of the present invention.
Figure 30:
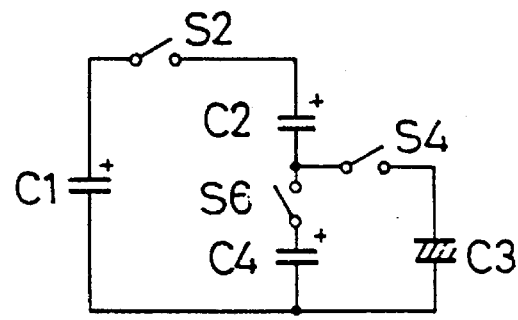
FIG. 30 is a schematic circuit diagram for explaining the operation of the fifteenth embodiment of FIG. 29.

15th Embodiment:

A circuit diagram of the fifteenth embodiment of the present invention is shown in FIG. 29, and an operating state of the same is shown in FIG. 30. In this embodiment, a no-load state is detected by a no-load detector 9, the detection is provided to a switching control means 10, the switching element S1 is turned OFF to cut the main circuit part from the power source, the switching elements S2, S4, S5 land S6 are turned ON to connect a series circuit of the capacitors C2 and C4 parallel to the capacitor C1 and smoothing capacitor C3 for equalizing their voltages, and the operation upon next load connection can be executed in a smooth manner. Thus, with the provision of the voltage control means for the respective capacitors in the non-load state, it is made possible to supply a constant voltage upon the next load connection and, with the setting of the operational frequency to be high, the respective capacitors and switching elements can be made smaller, so that the small power source device capable of generating the optional constant voltage can be provided.

Figure 31:
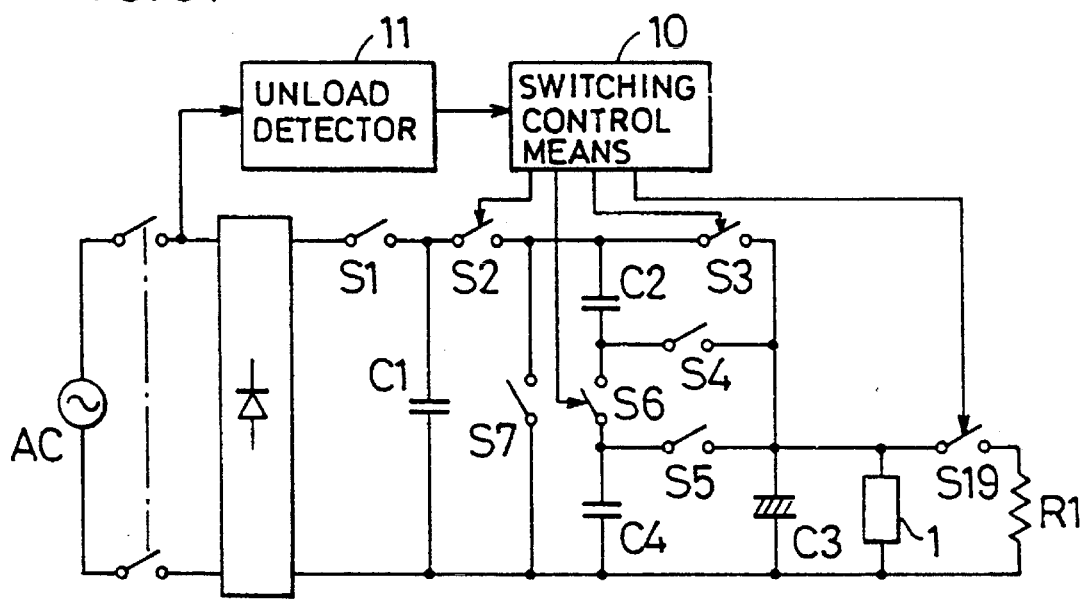
FIG. 31 is a circuit diagram showing a sixteenth embodiment of the present invention.
Figure 32:
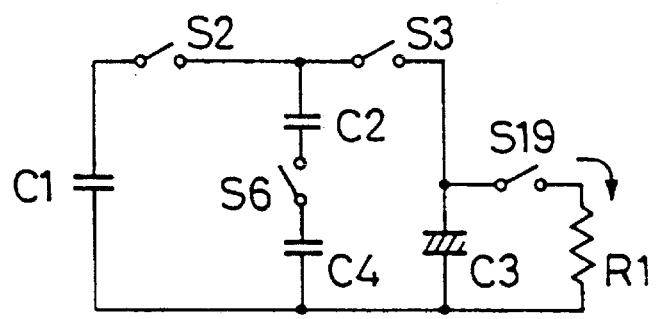
FIG. 32 is a schematic circuit diagram for explaining the operation of the sixteenth embodiment of FIG. 31.

16th Embodiment:

A circuit diagram of the sixteenth embodiment of the present invention is shown in FIG. 31, and its operating state is shown in FIG. 32. In the present embodiment, a stop detector 11 detects a stopped state, the detection is input into a switching control means 10, the switching elements S2, S3 and S6 are thereby turned ON to connect the series circuit of the capacitor C2 and C4 in parallel to the capacitor C1 and smoothing capacitor C3, and voltages at the respective capacitors are made to be discharged by turning a switching element 19 ON to connect them to a discharge resistor R1. With such provision of the voltage control means for the respective capacitors in the stop state, it is made possible to supply the constant voltage upon the operation and to render the load voltage zero upon the stop, and it is made possible to render the respective capacitors and switching elements to be small by setting the operational frequency to be high, so that the small power source device capable of generating the optional constant voltage can be provided.

Figure 33:
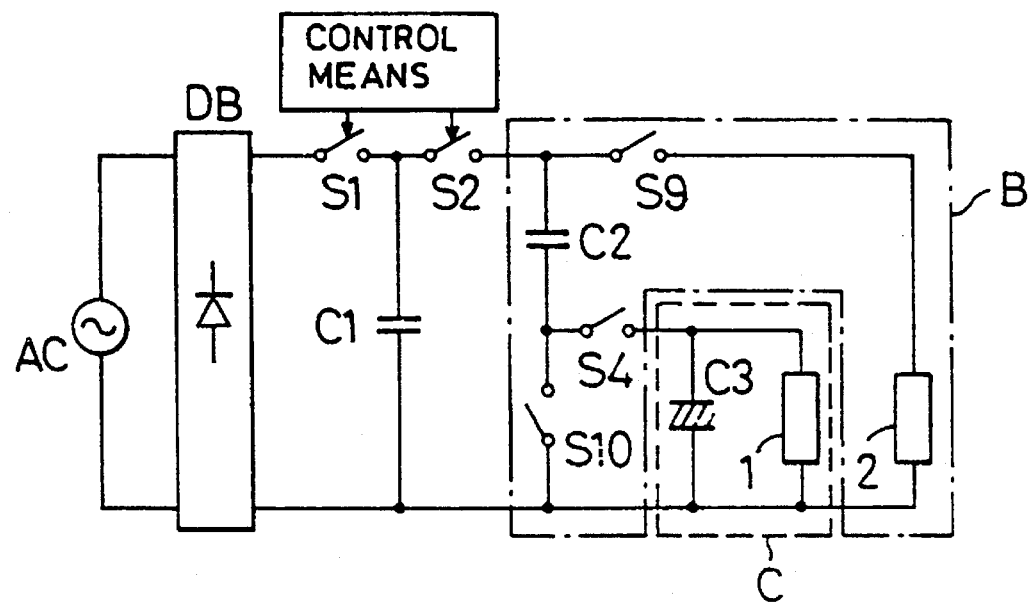
FIG. 33 is a circuit diagram showing a seventeenth embodiment of the present invention.

17th Embodiment:

FIG. 33 is a circuit diagram of the seventeenth embodiment, in which, as the voltage control means B, a series circuit of a switching element S9 and a further load 2 as well as a further switching element S10 are additionally connected, and the voltage of the capacitor C2 is adjusted by turning the switching elements S9 and S10 to be ON so as to have the charge partly discharged from the capacitor C2 to the load 2. In this embodiment, too, the input current distortion can be controlled by controlling the residual voltage in the capacitor C1 in the same manner as in the embodiment of FIG. 4, and the respective capacitors and switching elements can be made small by setting the operational frequency to be high, so that the small power source device capable of generating the optional constant voltage can be provided.

While the energy storing element has been referred to as being the capacitor throughout, it is needless to say that such other energy accumulating circuit as a voltage generating circuit utilizing a Zener diode and inductor or the like may be employed.

Effect of the Invention:

According to the present invention, there is shown an effect that the input current distortion can be controlled by constituting the power converting circuit with a combination of the capacitors and switching elements capable of boosting the source voltage, without employing any inductor, and controlling the voltage of the capacitors to be of a similar shape to the input voltage, and the constant voltage can be provided to the load by the voltage control means constituted by the voltage adjusting capacitors and a plurality of switching elements. Further, there is shown an effect that, as the respective switching elements can be operated by the pulse control and the small capacitors can be employed, any rush current can be eliminated. Still further, there is shown an effect that the dimensional minimization of the power source device is made possible since the respective capacitors and switching elements can be made small by setting the operational frequency to be high.

What is claimed is:

1. A power source device comprising:

a power source, a first energy storing means connected through a first switching element in parallel to said power source, a load circuit including a parallel connection of a voltage stabilizing means and a load and connected through a second switching element to said first energy storing means, means connected to said first and second switching elements for controlling their ON/OFF operation, and a voltage control means including a second energy storing means and a plurality of further switching elements and controlling an output voltage to said load circuit with switching operation of said further switching elements.

2. The device according to claim 1 wherein said power source is a pulsating current power source.

3. The device according to claim 1 wherein said first and second energy storing means are respectively a capacitor.

4. The device according to claim 1 wherein said voltage stabilizing means in said load circuit is a smoothing capacitor.

5. The device according to claim 1 wherein said ON/OFF controlling means includes means for varying ON period of said switching elements in response to an input voltage from said power source.

6. The device according to claim 1 wherein said voltage control means further includes a voltage adjusting capacitor connected in series to said second energy storing means for a voltage boosting, and means for discharging an energy of the voltage adjusting means to said load.

7. The device according to claim 1 wherein said voltage control means further include a capacitor connected to said plurality of switching elements for a voltage adjustment.

8. The device according to claim 7 wherein said plurality of switching elements includes a diode.

9. The device according to claim 1 wherein said voltage control means further includes a second load connected in parallel to a voltage controlling capacitor and means for discharging an energy to said second load.

10. The device according to claim 1 wherein said voltage control means comprises a voltage controlling capacitor as said second energy storing means, a voltage adjusting capacitor connected in parallel to said voltage controlling capacitor, and means for discharging an energy of the voltage control capacitor to said load.

11. The device according to claim 1 wherein said second energy storing means is a variable volume capacitor.

12. The device according to claim 1 wherein said voltage control means is an energy charging means for an energy from a voltage adjusting capacitor connected in parallel to a voltage controlling capacitor.

13. The device according to claim 1 wherein said voltage control means is an energy charging means for an energy from a smoothing capacitor connected in parallel to a voltage controlling capacitor.

14. The device according to claim 1 which further comprises a voltage boosting circuit including a plurality of switching elements and a capacitor.

15. The device according to claim 1 wherein said ON/OFF controlling means comprises means for adjusting ON period of output voltage stabilizing and adjusting switching elements.

16. The device according to claim 1 which further comprises a switching means for connecting all capacitors in parallel to each other through a switching operation to charge them and for connecting the capacitors in series to discharge them to said load, to thereby obtaining momentarily a high voltage.

17. The device according to claim 1 which further comprises means for maintaining the voltage of respective capacitors at a predetermined value in no-load state and for discharging them in stop state.

18. A power source device comprising:

a power source;

a series circuit of a first switching element and a first capacitor and connected in parallel to said power source;

a further series circuit of a second switching element, second capacitor and a load circuit of smoothing capacitor and a load connected in parallel to said smoothing capacitor, said further series circuit being connected across said first capacitor;

means for controlling ON period of at least one of said first and second switching elements in response to an input voltage, said ON period controlling a residual voltage at said first capacitor to be similar to said input voltage; and a voltage control means connected to said second capacitor and including a voltage adjusting capacitor and a plurality of further switching elements, for controlling a voltage applied to said load by connecting said voltage adjusting capacitor in series to the second capacitor when the input voltage is higher than a set voltage for discharging stored energy to the load but in parallel to said smoothing capacitor when the input voltage is lower than said set voltage for charging an energy therein.

19. The device according to claim 18 wherein said voltage control means includes means for connecting said voltage adjusting capacitor to said load when said input voltage is considerably higher than said set voltage.

* * * * *